United States Patent
Bircann et al.

(12) 
(10) Patent No.: US 6,729,351 B2
(45) Date of Patent: May 4, 2004

(54) EXPANDED RANGE MULTIPLE-STAGE METERING VALVE

(75) Inventors: Raul A. Bircann, Penfield, NY (US); Dwight O. Palmer, Rochester, NY (US)

(73) Assignee: Delphi Technologies, Inc., Troy, MI (US)

( * ) Notice: Subject to any disclaimer, the term of this patent is extended or adjusted under 35 U.S.C. 154(b) by 101 days.

(21) Appl. No.: 09/778,571

(22) Filed: Feb. 7, 2001

(65) Prior Publication Data

US 2001/0032678 A1 Oct. 25, 2001

Related U.S. Application Data

(60) Provisional application No. 60/183,944, filed on Feb. 22, 2000.

(51) Int. Cl.[7] .............................. F16K 1/44; F16K 1/54
(52) U.S. Cl. ........................... 137/630.14; 137/630.15; 137/630.22; 123/568.2
(58) Field of Search ................... 137/630.14, 630.15, 137/630.22; 123/79 C, 568.2

(56) References Cited

U.S. PATENT DOCUMENTS

| | | | | | |
|---|---|---|---|---|---|
| 2,360,612 A | * | 10/1944 | Ludeman | ...................... | 251/66 |
| 3,624,753 A | * | 11/1971 | Brumm | .................. | 137/630.14 |
| 3,773,085 A | * | 11/1973 | Caldwell, Jr. | .......... | 137/630.15 |
| 3,881,459 A | * | 5/1975 | Gaetcke | .................... | 123/188.1 |
| 4,041,979 A | * | 8/1977 | Grotloh | ................. | 137/599.16 |
| 4,078,582 A | * | 3/1978 | Hetz | ...................... | 137/630.14 |
| 4,094,277 A | * | 6/1978 | Goto et al. | ............. | 123/184.54 |
| 4,269,227 A | * | 5/1981 | Araki et al. | ........... | 137/630.14 |
| 4,672,203 A | * | 6/1987 | Holkeboer | .................. | 250/289 |
| 4,901,683 A | * | 2/1990 | Huff | .......................... | 123/79 C |
| 5,085,179 A | * | 2/1992 | Faulkner | ..................... | 123/543 |
| 5,172,722 A | | 12/1992 | Nishimura | | |
| 5,357,914 A | * | 10/1994 | Huff | ........................ | 123/188.2 |
| 5,460,146 A | * | 10/1995 | Frankenberg | .......... | 123/568.21 |
| 5,782,215 A | * | 7/1998 | Engelmann | ............... | 123/79 C |
| 5,848,608 A | * | 12/1998 | Ishigaki | ................. | 137/599.16 |

FOREIGN PATENT DOCUMENTS

| | | | | |
|---|---|---|---|---|
| DE | 1425707 | * | 5/1969 | ............ 137/630.14 |
| FR | 1341638 | | 9/1962 | |
| FR | 1341639 | | 9/1962 | |
| FR | 94 14623 | | 6/1994 | |
| FR | 2 727 734 | | 7/1996 | |
| GB | 262863 | * | 12/1926 | |

* cited by examiner

Primary Examiner—Michael Powell Buiz
Assistant Examiner—Ramesh Krishnamurthy
(74) Attorney, Agent, or Firm—Patrick M. Griffin

(57) ABSTRACT

An expanded-range pintle valve comprising a plurality of stages. Each stage comprises a valve seat and head capable of regulating flow through the valve over its own dynamic range. The valve head of a higher-flow stage includes the valve seat for the next-lower flow stage. The heads and seats for the multiple stages are nested concentrically, the progressively lower-flow stages having progressively smaller diameters. All valve heads except the lowest-flow head have axial and radial bores permitting flow therethrough so that flow may be regulated first by actuating the lowest-flow stage, then by actuating successively higher flow stages. A single pintle shaft connected to a solenoid actuator is adapted to engage each of the valve heads sequentially as the actuator progresses, beginning with the lowest-flow head, thereby extending incrementally the dynamic range of the valve as each stage is successively engaged.

5 Claims, 4 Drawing Sheets

EXPANDED RANGE MULTIPLE-STAGE METERING VALVE

CROSS-REFERENCE TO RELATED APPLICATIONS

This application claims the benefit of U.S. Provisional Application Serial No. 60/183,944, filed Feb. 22, 2000.

TECHNICAL FIELD

The present invention relates to pintle-type valves; more particularly, to such valves for variably regulating the flow of fluids and especially gases; and most particularly, to a multiple-stage pintle valve having a greatly expanded range of fluid metering, wherein a low-flow valve is disposed within the valve head of a high-flow valve, the two valves being actuated sequentially by a common pintle shaft and actuator.

BACKGROUND OF THE INVENTION

Pintle-type valves are used for a wide variety of on/off and metering functions. In general, pintle valves are not well-suited to metering, since flow across the valve seat as a function of pintle and head travel typically is quite non-linear. Many pintle valves go from fully closed to substantially fully open with a relatively short stroke of the actuator, thus making difficult the precise metering of fluid at intermediate degrees of openness. Such valves are said to have a narrow dynamic range. For low total flow applications, relatively small valves typically are used, and for larger total flow applications, larger valves are used. However, a serious problem arises in applications wherein a given pintle valve is required to meter fluid over a wide range of flows.

It is well known in the automotive art to provide a variable valve connecting the exhaust manifold with the intake manifold of an internal combustion engine to permit selective and controlled recirculation of a portion of an engine's exhaust gas into the fuel intake stream. Such recirculation is beneficial for reducing the burn temperature of the fuel mix in the engine to reduce formation of nitrogen and sulfur oxides which are significant components of smog. Such a valve is known in the art as an exhaust gas recirculation (EGR) valve.

Typically, an EGR valve is a pintle-type valve having a valve body enclosing a chamber disposed between a first port in the exhaust manifold and a second port in the intake manifold; a valve seat dividing the chamber between the two ports; a valve head fitted to mate with the valve seat; a valve stem or pintle extending from the valve head through a bore in a sidewall of the valve body; and a solenoid actuator mounted on the exterior of the valve body and operationally connected to the outer end of the valve stem. The stroke of the solenoid is regulated as by a computer in response to the composition of the intake and exhaust streams to vary the axial position of the valve pintle and valve head with respect to the valve seat to provide a desired flow volume of exhaust gas through the valve.

Because of the dynamic range limitations of known pintle-type valves, a wide range of EGR valve sizes is presently required for optimum metering on a wide range of engine sizes. Large engines require large EGR valves, and smaller engines require smaller EGR valves. A large EGR valve on a small engine cannot be controlled with the degree of flow resolution required. If an EGR valve is too small for an engine, then fuel economy and emissions quality can be compromised; if sized too large, then controllability, durability, and performance can be compromised.

What is needed is a means for extending the dynamic range of a pintle valve so that a single valve can be used over a wide range of flow requirements, thus reducing manufacturing and replacement part complexity and cost.

It is the primary object of the invention to provide an improved pintle valve which extends the precise controllable range of a single valve over a broad range of flow requirements.

It is a further object of the invention to save cost and complexity in manufacturing and inventorying a wide variety of sizes of pintle valves.

SUMMARY OF THE INVENTION

The invention is directed to a pintle valve comprising a plurality of stages. Each stage comprises a valve seat and head capable of regulating flow through the valve over its own dynamic range. The valve head of a higher-flow stage includes the valve seat for the next-lower flow stage. The heads and seats for the multiple stages are nested concentrically, the progressively lower-flow stages having progressively smaller diameters. All valve heads except the lowest-flow head have axial and radial bores permitting flow therethrough so that flow may be regulated first by actuating the lowest-flow stage, then by actuating successively higher flow stages. A single pintle shaft connected to a solenoid actuator is adapted to engage each of the valve heads sequentially as the actuator progresses, beginning with the lowest-flow head, thereby extending incrementally the dynamic range of the valve as each head is successively engaged.

BRIEF DESCRIPTION OF THE DRAWINGS

The foregoing and other objects, features, and advantages of the invention, as well as presently preferred embodiments thereof, will become more apparent from a reading of the following description in connection with the accompanying drawings, in which.

DESCRIPTION OF THE PREFERRED EMBODIMENT

The benefits afforded by the present invention will become more readily apparent by first considering a prior art single-stage pintle valve.

Figure 1:
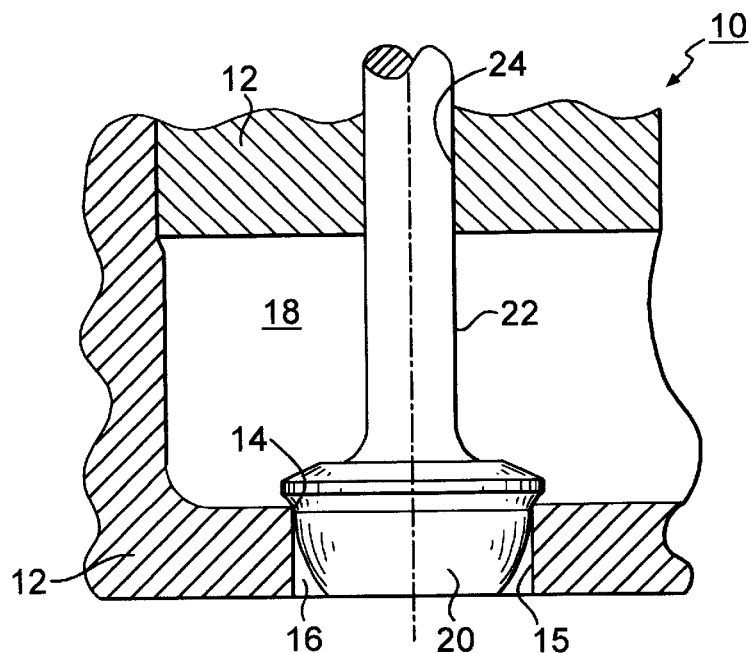
FIG. 1 is an elevational cross-sectional view of a prior art pintle valve in closed position.

Referring to FIG. 1, a prior art pintle valve 10 includes a valve body 12 having a valve seat 14 disposed in a first bore 15 between a first chamber 16 and a second chamber 18. In use as, for example, an EGR valve, chambers 16 and 18 may communicate with the exhaust and intake systems, respectively, of an internal combustion engine (not shown in FIG. 1) or the reverse. Valve head 20 is disposed adjacent to seat 14 for selectively mating therewith to open or to close communication between chambers 16 and 18. Valve stem, or pintle, 22 extends from head 20 through a second bore 24 in body 12, coaxial with first bore 15, and typically is actuated reciprocally by an external solenoid actuator (not shown) attached to pintle 22 to open and close the valve.

Referring to FIGS. 2–6, a two-stage pintle valve 26 having first and second stages 27,29, respectively, in accordance with the invention includes a valve body 12 having a secondary valve seat 14' in a first bore 15 separating first and second chambers 16,18, and a second bore 24 for receiving a pintle as described below connected for reciprocal actuation to a conventional solenoid actuator (not shown). As will be seen below, the two-stage valve is operated first with its primary stage alone and then in combination with its secondary stage; the secondary stage cannot be operated without the primary stage. However, the presentation of components is facilitated by presenting herewith the secondary stage before the primary stage.

Coaxially disposed within chamber 18 is a secondary valve head 28' having a secondary mating surface 30' opposable to secondary seat 14' for secondary regulation of fluid flow between chambers 16 and 18 across secondary seat 14'.

Secondary valve head 20' is adapted as follows to contain and form part of a primary valve stage therein. Secondary head 20' is provided with a central chamber 32 in communication with chamber 16 via a bore comprising a primary valve seat 14 and with chamber 18 via one or more radial bores 34. Chamber 32 further is stepped to form an annular shoulder 36 for receiving a shaft stop washer 38 having an axially-extending cylindrical flange 40. An optional spring stop washer 42, also flanged, is included in the preferred embodiment. Head 20' is provided with a cylindrical flange 37 surrounding shoulder 36, which flange is rolled or crimped inwards during valve assembly, as shown in FIG. 2, to centrally position and immovably retain washers 38,42 within head 20'.

A well 44 in body 12 is receivable of one end of a partially-compressed coil spring 46, the opposite end being received by spring stop washer 42. A valve pintle 48 is axially and slidably disposed through second bore 24, spring 46, spring stop washer 42, shaft stop washer 38, and chamber 32, and terminates in a primary valve head 20 having a primary mating surface 30 opposable to primary seat 14 for primary regulation of fluid flow between chambers 16 and 18 across primary seat 14 and via radial bores 34 in secondary head 20'. Primary head 20 is provided with an axial shoulder 50 having a diameter greater than the diameter of pintle 48 and flange 40. The distance between shoulder 50 and flange 40 governs the extent of removal of surface 30 from seat 14 and therefore the total open area of the primary valve.

For optimal performance, shaft stop washer 38 preferably is formed of a lubricious material, for example, brass, to minimize friction with pintle 48. Washer 38 may act as a bearing or guide for pintle 48 and therefore has a close diametrical tolerance to the pintle. Spring stop washer 42, which guides the action of the spring and prevents contact of the spring with the pintle, may be formed of the same or different material as washer 38. Preferably, the bore of washer 42 is slightly larger than the bore of washer 38.

Figure 2:
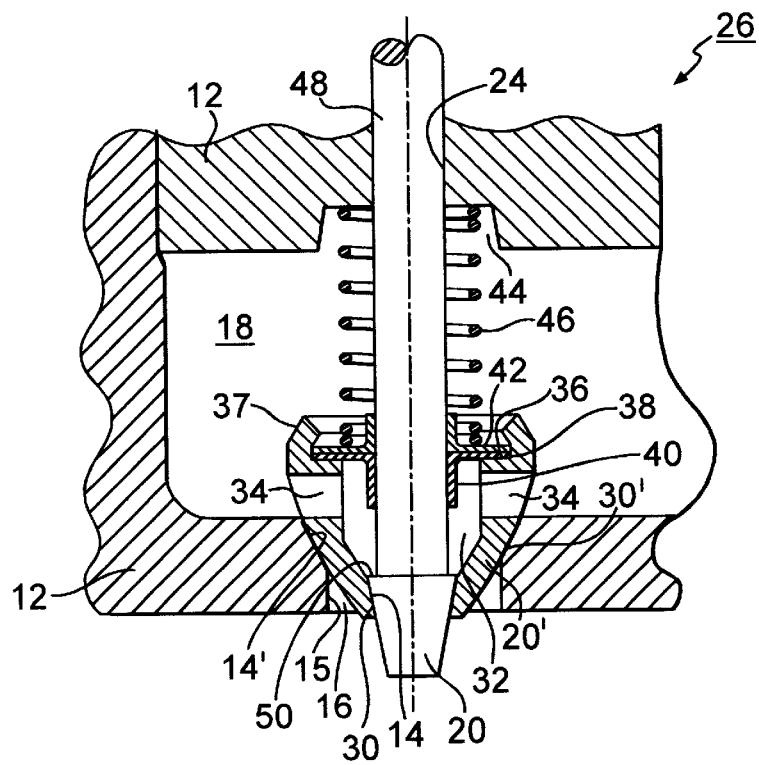
FIG. 2 is an elevational cross-sectional view of a first embodiment of an extended-range multiple-stage pintle valve in accordance with the invention, showing a two-stage valve with both stages closed.
Figure 3:
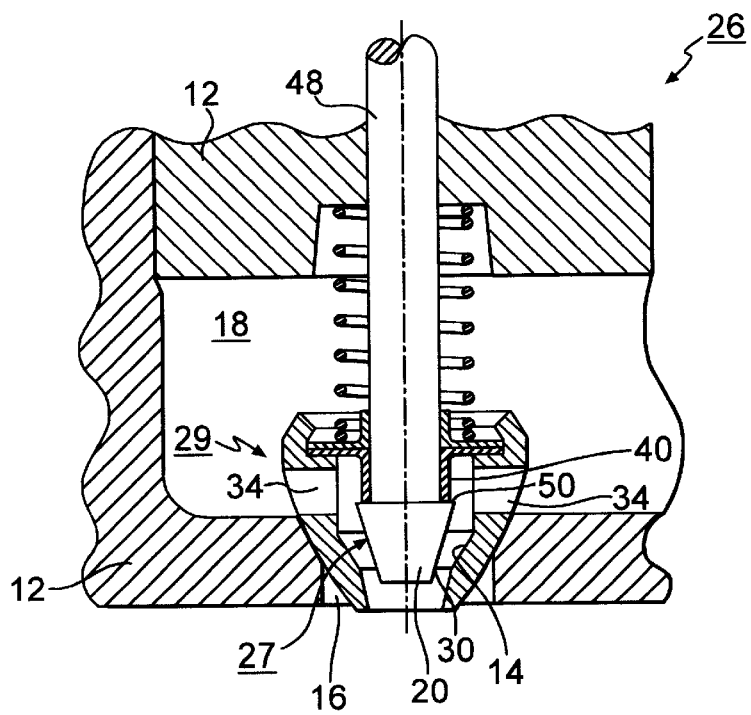
FIG. 3 is a view like that shown in FIG. 2, showing the valve with the first stage open.

In operation, starting from a fully closed position as shown in FIG. 2, actuation of the solenoid actuator retracts pintle 48, causing primary surface 30 on primary head 20 to be withdrawn axially from primary seat 14, thereby permitting primary flow between chambers 16 and 18 through bores 34. Spring 46 keeps the secondary stage closed during operation of the first stage. Shoulder 50 approaches flange 40 as the primary stage valve opens. When shoulder 50 engages flange 40, as shown in FIG. 3, the primary valve is fully open. The metering range of the solenoid stroke for the primary stage is thus between fully closed and the engagement of the shoulder and flange. This distance may be varied by varying the axial length of flange 40 as desired for a particular application. In general, there is no benefit to making this distance greater than is required for the pressure drop across seat 14 to become substantially zero, beyond which point no further variable flow metering by the primary stage is possible, flow being governed by the total fixed cross-sectional area of bores 34.

Figure 4:
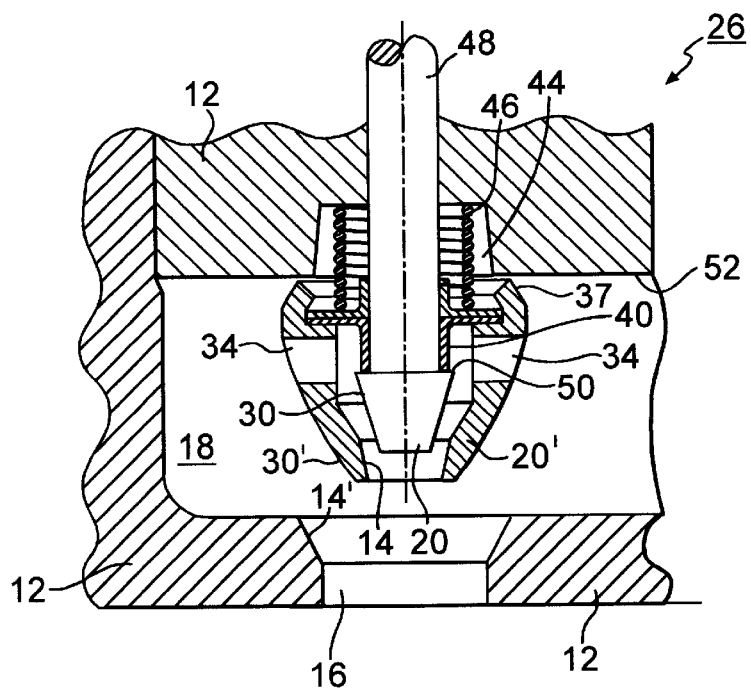
FIG. 4 is a view like that shown in FIGS. 2 and 3, showing the valve with both stages open.

Because washer 38 is captured within secondary head 20', continued axial retraction of pintle 48, overcoming the spring force of spring 46, causes secondary surface 30' on secondary head 20' to be withdrawn axially from secondary seat 14', thereby permitting secondary flow between chambers 16 and 18 across seat 14' in addition to the primary flow through bores 34. Head 20' may be withdrawn as far as may be desired for a particular application; as shown in FIG. 4, head 20' may be withdrawn until flange 37 engages surface 52 of body 12, spring 46 being compressed into well 44.

Figure 5:
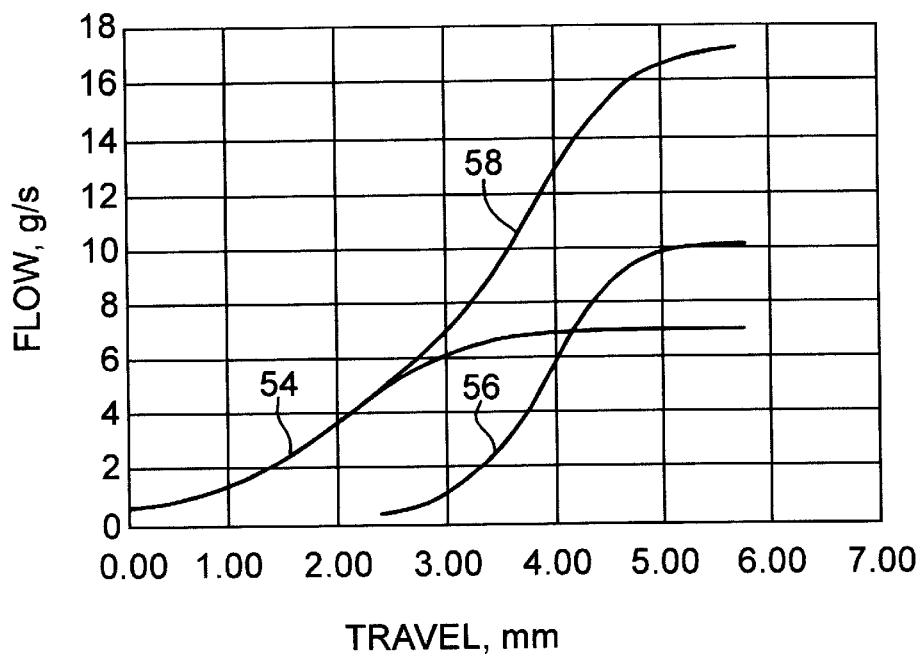
FIG. 5 is a graph showing flow delivery curves as a function of actuator stroke for each of the individual stages and for the combined stages of the valve shown in FIGS. 2–4.

Typical sigmoid flow curves for the primary and secondary stages as a function of pintle travel are shown as curves 54 and 56, respectively, in FIG. 5. The distance between shoulder 50 and flange 40 being approximately 2.5 mm, the secondary valve begins to open with pintle travel beyond that point. Thus the primary and secondary flows shown in curves 54 and 56 are added together as a total flow, shown in curve 58 which is an extension of primary curve 54.

The advantage conferred by a two-stage pintle valve in accordance with the invention is shown clearly in FIG. 5. A prior art single-stage valve, such as valve 10 in FIG. 1, is capable of metering flow only over a limited flow range, such as is indicated to by curve 54 or curve 56, depending upon the actual size of the valve. However, by placing a smaller valve within the metering head of a larger valve and operating both valves sequentially with a single pintle and actuator, as shown in FIGS. 2–4, an expanded metering range is obtained which is greater than can be obtained with any comparable single-stage valve.

Figure 7:
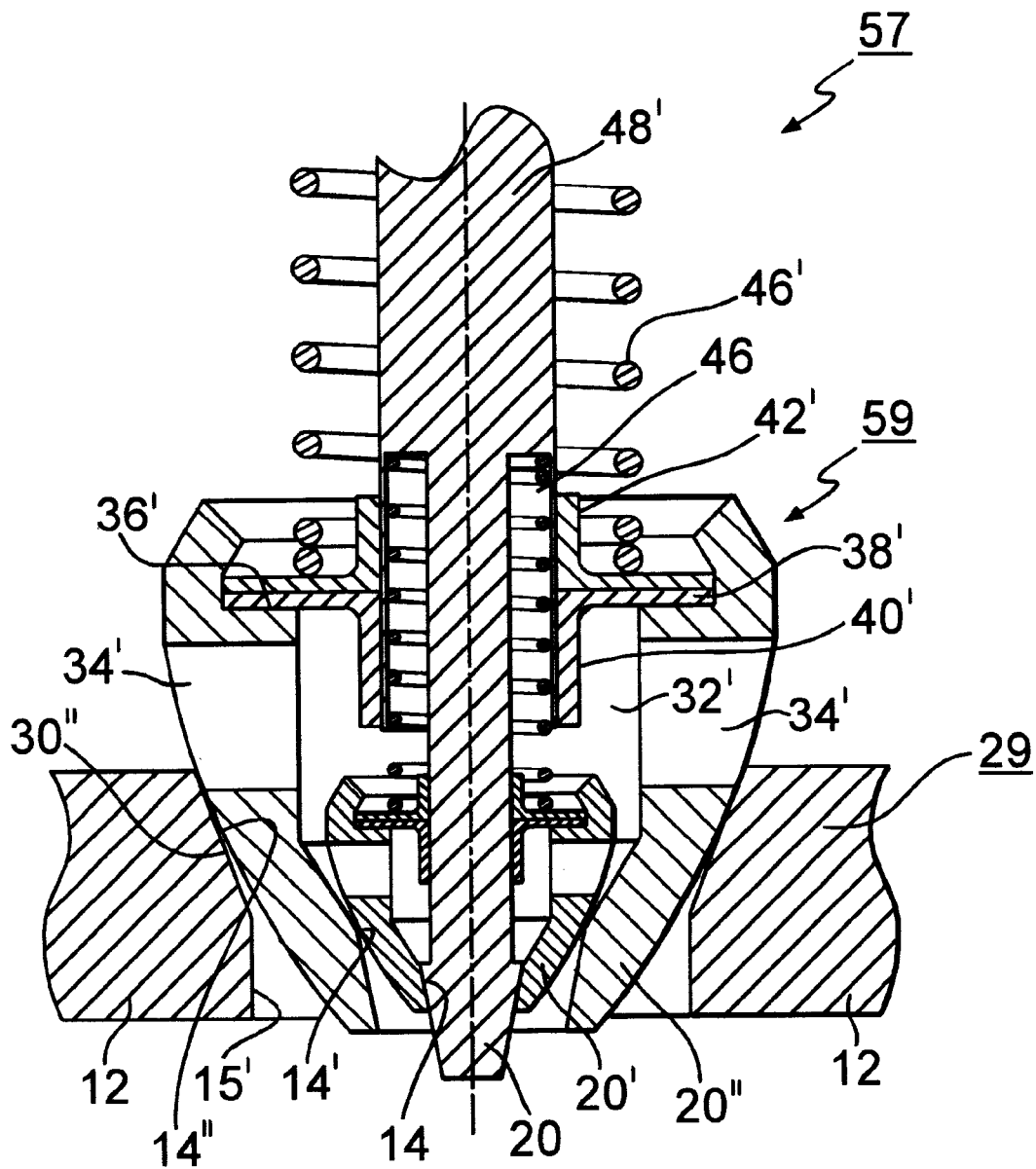
FIG. 7 is a cross-sectional view of a second embodiment of an expanded-range multiple-stage pintle valve in accordance with the invention, showing a three-stage valve with the three stages closed.

Stage multiples larger than two-stage are possible. A three-stage pintle valve 57 in accordance with the invention is shown in FIG. 7, in which a tertiary stage 59 surrounds the primary and secondary stages 27,29 shown in FIGS. 2–4. The tertiary stage 59 is essentially a larger version of the secondary stage disclosed in the two-stage embodiment. A valve body 12 is provided with a first bore 15' containing a tertiary seat 14". A tertiary mating surface 30" on tertiary metering head 20" is opposable to seat 14". The tertiary stage comprises elements analogous to those in the secondary stage: axial bores 34', shaft stop washer 38', spring stop washer 42', flange 40', spring 46', shoulder 36', chamber 32', as well as secondary seat 14'. Chamber 32' contains all the elements of the two-stage valve shown in FIGS. 2–4. Pintle 48' is configured as shown in FIG. 7 to accommodate springs 46 and 46' and to permit the pintle to operate primary head 20, secondary head 20', and tertiary head 20" sequentially, in an operating sequence which is an obvious extension of the sequence discussed supra regarding the two-stage valve.

Figure 6:
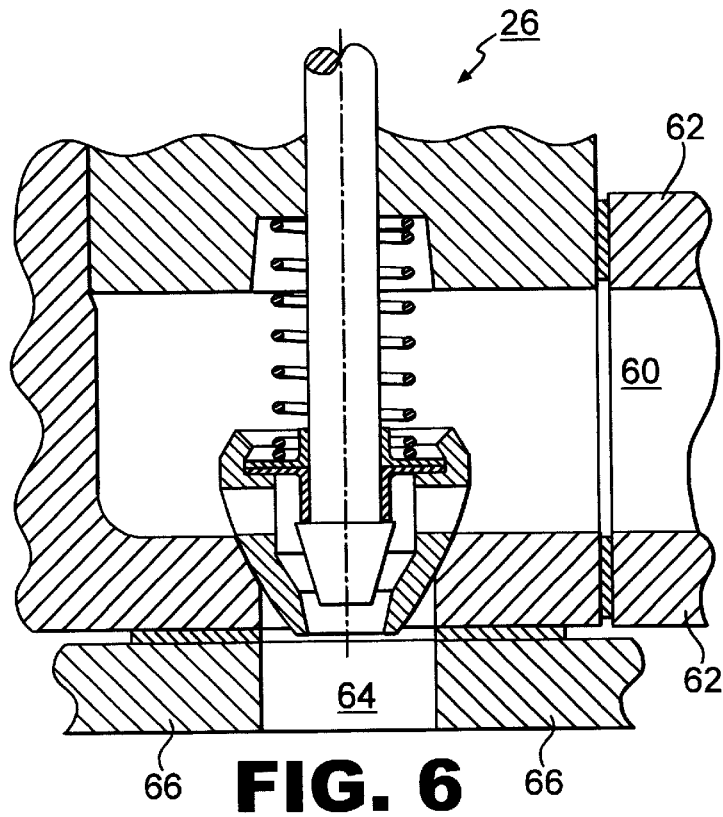
FIG. 6 is a cross-sectional view showing the embodiment of FIG. 2 installed for use as an EGR valve between the intake and exhaust manifolds of an internal combustion engine.

The invention is especially useful in the field of automotive engines, in which it may be desirable to recirculate a portion of the exhaust gases into the intake manifold to reduce the burn temperature of the mix and thus reduce formation of nitrogen and sulfur oxides. The invention permits use of an improved, single size, multiple-stage EGR valve on a wide range of engines, each usage being optimized for a specific engine displacement. FIG. 6 shows such a valve installed in an internal combustion engine between port 60 in an exhaust manifold 62 and port 64 in an intake manifold 66 to permit exhaust gas recirculation therebetween.

The foregoing description of the preferred embodiment of the invention has been presented for the purpose of illustration and description. It is not intended to be exhaustive nor is it intended to limit the invention to the precise form disclosed. It will be apparent to those skilled in the art that the disclosed embodiments may be modified in light of the above teachings. The embodiments described are chosen to provide an illustration of principles of the invention and its practical application to enable thereby one of ordinary skill in the art to utilize the invention in various embodiments and with various modifications as are suited to the particular use contemplated. Therefore, the foregoing description is to be considered exemplary, rather than limiting, and the true scope of the invention is that described in the following claims.

What is claimed is:

1. An expanded-range multiple-stage pintle valve, comprising:
    a) a valve body enclosing a first chamber and having a first axial bore connecting said first chamber to a second chamber;
    b) a secondary valve seat disposed within said first axial bore;
    c) a secondary valve head having a secondary mating surface opposable to said secondary valve seat to regulate secondary fluid flow therebetween, said secondary head having an internal chamber therein, said chamber being in communication with said first and second chambers in said valve body, said secondary valve head further including a primary valve seat disposed between said internal chamber and said first chamber in said valve body, said secondary valve head further including a shaft stop washer disposed coaxially therein;
    d) a primary valve head disposed within said secondary valve head and having a primary mating surface opposable to said primary valve seat on said secondary valve head to regulate primary fluid flow therebetween through said secondary valve head;
    e) a valve pintle for actuating said primary and secondary valve heads, said pintle being connected at a first end to said primary valve head and extending through said secondary valve head and said valve body for actuation by actuating means;
    f) means for engaging and releasing said secondary valve head from said pintle over a portion of the stroke of said pintle actuation; and
    g) a shoulder on said primary valve head having a diameter greater than the diameter of said pintle;
    h) an axial flange on said shaft stop washer extending towards said shoulder; and
    i) spring means compressively disposed coaxially of said pintle between said shaft stop washer and a wall of said second valve chamber for urging said secondary mating surface of said secondary valve head toward said secondary valve seat to maintain said secondary valve in a closed position while said primary valve is being actuated by said pintle, said shoulder being engaging of said flange to actuate said secondary valve at a predetermined distance of stroke of said pintle.

2. A pintle valve in accordance with claim 1 further comprising a spring stop washer, above and in abutting engagement with said shaft stop washer and said spring means compressively disposed coaxially of said pintle between said spring stop washer and said wall of said second valve chamber.

3. A two-stage pintle valve having an expanded flow range, said valve comprising a plurality of concentrically-arranged flow stages ranging from highest flow to lowest flow disposed within a common valve body and being actuable sequentially from lowest flow to highest flow by a common pintle extending through said stages and being selectably attachable to at least one of said stages, each of said stages including a valve head, said head for said highest flow stage being matable with a highest flow seat disposed in said valve body, each of said heads having a mating surface formed on an outer surface thereof opposed to an adjacent valve seat for regulating flow therebetween and, except said head for said lowest flow stage, a valve seat for the next lower flow stage formed on an inner surface thereof opposed to an adjacent mating surface for regulating flow therebetween, and said common valve body further comprises a first chamber, and said head for said highest flow stage has a central chamber and at least one radial bore for communicating between said first chamber and said central chamber and further including a shaft stop washer disposed coaxially therein, said head for said next lower flow stage includes a shoulder having a diameter greater than the diameter of said pintle, and wherein said head for highest flow stage includes:
    an axial flange on said shaft stop washer extending towards said shoulder; and
    spring means compressively disposed coaxially of said pintle between said shaft stop washer and a wall of said central chamber for urging said mating surface of said head for said highest flow stage towards said highest flow stage valve seat to maintain said head for said highest flow stage in a closed position while said next lower flow stage is being actuated by said pintle, said shoulder being engaging of said flange to actuate said head for said highest flow stage at a predetermined distance of stroke of said pintle.

4. An expanded-range multiple-stage pintle valve, comprising:
    a) a valve body enclosing a first chamber and having a first axial bore connecting said first chamber to a second chamber;
    b) a secondary valve seat disposed within said first axial bore;
    c) a secondary valve head having a secondary mating surface opposable to said secondary valve seat to regulate secondary fluid flow therebetween, said secondary head having an internal chamber therein, said chamber being in communication with said first and second chambers in said valve body, said secondary valve head further including a primary valve seat disposed between said internal chamber and said first chamber in said valve body, said secondary valve head further including a shaft stop washer disposed coaxially therein;

d) a primary valve head disposed within said secondary valve head and having a primary mating surface opposable to said primary valve seat on said secondary valve head to regulate primary fluid flow therebetween through said secondary valve head;

e) a valve pintle for actuating said primary and secondary valve heads, said pintle being connected at a first end to said primary valve head and extending through said secondary valve head and said valve body for actuation by actuating means;

f) means for engaging and releasing said secondary valve head from said pintle over a portion of the stroke of said pintle actuation; and g) said inner chamber of said secondary valve head is stepped to form an annular shoulder for receiving said shaft stop washer;

h) said secondary valve head further comprising a cylindrical flange surrounding said annular shoulder;

i) a shoulder on said primary valve head having a diameter greater than the diameter of said pintle;

j) an axial flange on said shaft stop washer extending towards said shoulder; and k) spring means compressively disposed coaxially of said pintle between said shaft stop washer and a wall of said second valve chamber for urging said secondary mating surface of said secondary valve head toward said secondary valve seat to maintain said secondary valve in a close position while said primary valve is being actuated by said pintle, said shoulder being engaging of said flange to actuate said secondary valve at a predetermined distance of stroke of said pintle.

5. An expanded-range pintle valve, comprising:

a) a valve body having a main chamber therein and inlet and outlet means including a secondary flow seat;

b) secondary valve means disposed within said main chamber for regulating flow across said secondary flow seat and including a primary flow seat, said secondary valve means having a central chamber and a radial bore for communicating between said main chamber of said valve body and said central chamber of said secondary valve means;

c) said secondary valve means further including a shaft stop washer with an axial flange disposed coaxially therein;

d) primary valve means disposed within said secondary valve means for regulating flow across said primary flow seat through said secondary valve means;

e) said primary valve means having a shoulder;

f) pintle means extending through said secondary valve means and attached to a primary valve head in said primary valve means for actuating said primary valve means; and g) spring means compressively disposed coaxially of said pintle between said shaft stop washer and a wall of said main chamber for urging said secondary valve means toward said secondary flow seat to maintain said secondary means in a closed position while said primary valve means is being actuated by said pintle; and h) said shoulder of said primary valve means being engaging of said flange of said secondary valve means to actuate said secondary valve means.

* * * * *